United States Patent
Delaite et al.

(10) Patent No.: US 6,914,085 B2
(45) Date of Patent: Jul. 5, 2005

(54) EXPANDED POLYPROPYLENE GRANULE COMPOSITION

(75) Inventors: Emmanuel Michel Delaite, Braine-le-Comte (BE); Herve Joseph Gislain Cuypers, Ceroux-Mousty (BE)

(73) Assignee: BP Belgium N.V. (BE)

( * ) Notice: Subject to any disclaimer, the term of this patent is extended or adjusted under 35 U.S.C. 154(b) by 23 days.

(21) Appl. No.: 10/481,555

(22) PCT Filed: Jun. 17, 2002

(86) PCT No.: PCT/EP02/06635

§ 371 (c)(1),
(2), (4) Date: Dec. 19, 2003

(87) PCT Pub. No.: WO03/000753

PCT Pub. Date: Jan. 3, 2003

(65) Prior Publication Data

US 2004/0198879 A1 Oct. 7, 2004

(30) Foreign Application Priority Data

Jun. 20, 2001 (EP) .............................. PCT/EP01/07017

(51) Int. Cl.$^7$ .............................. C08J 9/16; C08J 9/18; C08J 9/228; C08F 10/06; C08K 5/00
(52) U.S. Cl. ........................ 521/143; 521/52; 521/60; 521/144; 521/909; 524/130; 524/132; 524/323
(58) Field of Search ........................ 521/52, 60, 143, 521/144, 909; 524/130, 132, 323

(56) References Cited

U.S. PATENT DOCUMENTS

| | | | | | |
|---|---|---|---|---|---|
| 4,916,198 A | * | 4/1990 | Scheve et al. | .............. | 526/351 |
| 5,902,858 A | * | 5/1999 | Okura et al. | ................ | 525/263 |
| 6,515,037 B2 | * | 2/2003 | Tsutsui et al. | .............. | 521/142 |
| 6,624,099 B1 | * | 9/2003 | Shah | .......................... | 442/290 |

* cited by examiner

*Primary Examiner*—Kelechi C. Egwim
(74) *Attorney, Agent, or Firm*—Wallace L. Oliver; Norval B. Galloway

(57) ABSTRACT

Expanded granules or a moulded article made therefrom, based on semicrystalline propylene polymer comprising, per 100 parts by weight, less than 0.035 parts by weight of volatile compounds and processes for its preparation.

17 Claims, No Drawings

EXPANDED POLYPROPYLENE GRANULE COMPOSITION

The present invention relates to a composition comprising expanded polypropylene granules and particularly to a composition having an improved resistance to fogging. It also relates to a process for obtaining such compositions, and to cellular articles fashioned from such expanded granules.

It is known to use propylene polymers for manufacturing moulded cellular articles from expanded granules. These moulded cellular articles are widely used as interior materials for automobiles and other vehicles since they are light in weight, heat resistant and easy to mould. However, in hot weather some components of the plastic materials evaporate, and can coat the interior glass surfaces of vehicles causing deterioration of visibility and even an offensive odour. This phenomenon, known as fogging, is a cause of concern for the automotive manufacturers.

In order to address the above problem, JP-A-06-234898 suggests the use of blends of grafted polyolefin with polyamide and specific inorganic fibres such as glass fibre. However these blends, being different from the conventional propylene polymers used in the other parts of the vehicle, are not easily recycled. EP-A-0905175 or JP-A-11-263863 proposes the addition of fogging inhibitors such as aluminium sulfate or specific carbon blacks, and JP-A-11-028789 and WO 00/06645 suggest the addition of specific additives to the layers laminated onto the foamed articles. However the fogging resistance of cellular articles still needs to be improved.

From above it appears that the fogging problem is not satisfactorily solved and remains a concern, particularly for cellular articles made from expanded beads which are not addressed by the above mentioned disclosures.

Accordingly, the aim of the present invention is to provide a polypropylene based expanded granule and moulded article made therefrom having an improved fogging resistance.

The present invention therefore provides in a first aspect expanded granules or a moulded article made therefrom based on semi-crystalline propylene polymer, comprising, per 100 parts by weight, less than 0.035 parts by weight of volatile compounds, preferably less than 0.020 parts by weight of volatile compounds.

In a further aspect, the invention provides a process for obtaining such expanded granules or a moulded article, comprising the steps of polymerising propylene and any comonomer(s) in a hydrocarbon diluent chosen from liquid alkanes and cycloalkanes, wherein the molar fraction of propylene is at most 0.9, and then converting the resultant polypropylene into expanded granules and optionally then into a moulded article. In an alternative process of the invention, a propylene polymer is contacted with an aliphatic or cycloaliphatic hydrocarbon diluent containing from 4 to 7 carbon atoms at a temperature in the range of 5 to 60° C. for a period of from 0.1 to 4 hours in an amount of from 0.1 to 5 g of propylene polymer per 1 g of hydrocarbon diluent, and then separated from said diluent, before being converted into expanded granules and optionally then into a moulded article.

In a further alternative process, a polypropylene polymer is brought into contact with a gas stream at a temperature in the range of 60 to 160° C. for a duration from 30 minutes to 100 hours, after which the resultant polypropylene is converted into expanded granules and optionally then into a moulded article.

Optionally either before or after any of the above processes, the polymer may be melt mixed with, per 100 parts by weight of the final composition, from 0.03 to 0.5 parts by weight of sterically hindered phenol having a molecular weight of at least 500 daltons, and up to 0.3 parts by weight of an organic phosphite of the formula $P(OR')_3$ wherein each R' independently represents an alkyl or aryl radical at least one of which is sterically hindered, in order to provide thermal stability to the polymer.

For the purposes of the present invention, the content of volatile compounds contained in a composition is determined as follows:

A strip weighing 15 mg (+/−2 mg) and 50–60 mm long is cut inside the moulded article and placed in a vessel at 120° C. for one hour. A helium stream is passed across the strip at a flow rate of 15 ml/min before being cooled at −196° C. to trap the desorbed compounds.

The content of volatile compounds is defined as the quantity of compounds trapped in the composition which have an elution time of at most 40 minutes as determined by gas phase chromatography by means of a semi capillary column equipped with a FID detector (column CP-Sil 24 CB, diameter: 0.53 mm, length: 15 m, helium flow: 10 ml/min, temperature: 120° C. during the 2 first minutes, then increase at 8° C./min to 265° C.). When preparing the samples, it is important to avoid any contamination (for example, the samples must not be touched with the fingers).

It is believed that the volatile compounds contribute to the fogging because of their relatively high volatility. Accordingly their content should be maintained as low as possible. For economic reasons, however, it is generally higher than 0.0005, particularly higher than 0.001 part by weight per 100 parts by weight of composition. A content of at most 0.035 parts by weight gives advantageous results. A content of at most 0.02 parts by weight is particularly preferred.

It is further believed that the volatile compounds are mainly formed by volatile hydrocarbon compounds contained in the propylene polymer, and also by the polymer additive(s) and/or by the degradation products thereof.

The volatile hydrocarbon compounds are generally oligomers of propylene formed during the polymerisation reaction. They usually contain from 9 to 39 carbon atoms.

Additives which are typically incorporated in the polymer to enhance the thermal stability of the polymer, but which contribute to the volatile compounds through their degradation product(s) and/or contaminants, include sterically hindered phenols, and organic phosphites of the formula $P(OR)_3$ wherein each R represents independently alkyl or aryl radicals. However it is specifically those sterically hindered phenols which have a molecular weight lower than 500 daltons (phenol (a)), and those organic phosphites of the formula $P(OR)_3$ in which none of the R groups is a sterically hindered alkyl or aryl radical (phosphite (a)), which contribute most significantly to the volatile compounds.

Examples of phenol (a) are 2,4-dimethyl,6-tert-butylphenol, 2,6-ditertbutyl para cresol, and octyl beta-(3,5-ditertbutyl-4-hydroxyphenyl)-propionate. Examples of phosphite (a) are tris(para-nonylphenyl)phosphite and distearylpentaerythrityldiphosphite.

Accordingly, compositions according to the invention containing, per 100 parts by weight, less than 0.05 parts by weight of such low molecular weight sterically hindered phenols (a) and less than 0.05 parts by weight of such non-sterically-hindered organic phosphites (a) are particularly preferred.

Conversely, it has been found that stericalty hindered phenols having a molecular weight of at least 500 daltons (phenol (b)), and organic phosphites of the formula P(OR')$_3$ wherein each R' represents independently alkyl or aryl radicals of which at least one R' represents a sterically hindered alkyl or aryl radical (phosphite (b)), have a much lower adverse effect in terms of fogging resistance, whilst retaining the beneficial thermal stabilisation properties for which they are added. Accordingly, compositions containing, per 100 parts by weight, from 0.03 to 0.5 parts by weight of sterically hindered phenols having a molecular weight of at least 500 daltons (phenol (b)), and up to 0.3 parts by weight of organic phosphites of formula P(OR')$_3$ wherein each R' represents independently alkyl or aryl radicals providing that at least one R' represents a sterically hindered alkyl radical (phosphite (b)), are preferred.

The content of phenol (b) is usually of at least 0.05 parts per 100 parts of the composition. Contents of at least 0.1 part give the best results. Compositions containing at most 0.4 part of phenol (b) are very suitable.

The phenols (b) having a molecular weight of at least 700 daltons are preferred because of they lead to polymers having a better compromise of stability and fogging resistance.

Examples of such phenols (b) are the pentaerythrityl tetrakis(3,5-ditertbutyl-4-hydroxyphenyl) propionate and the bis(beta-3,5-ditertbutyl-4-hydroxyphenyl-ethyl) suberate.

Compositions containing, per 100 parts by weight, at least 0.02 part per 100 parts of phosphite (b) are preferred. Compositions containing at least 0.04 part of phosphite (b) have a good compromise of stability and fogging resistance. The content of phosphite (b) is furthermore usually at most 0.2, preferably at most 0.15 parts by weight.

An example of such phosphites (b) is tris(2,4-ditertbutylphenyl) phosphite.

It is moreover preferable that the amounts of phenol (b) and of phosphite (b) are such that their weight ratio is in the range of 1.5 to 10.

The propylene polymers used in the composition according to the invention are semi-crystalline polymers in the sense of the meaning given in "Plastic Engineering" 2$^{nd}$ edition, R. J. Crawford, Pergamon Press (1987) pages 3 and 4. The propylene polymers used in the present invention are generally chosen from the propylene homopolymers and the copolymers of this latter containing at most 50 weight % of at least one comonomer chosen from ethylene and α-olefins containing from 4 to 8 carbon atoms and their mixtures. The copolymers of propylene are preferably chosen from copolymers of propylene with up to 20 mol % ethylene and/or 1-butene.

Copolymers of propylene containing from 1 to 6 mol % of ethylene are particularly preferred because they provide a good compromise between expansion and moulding behaviour and rigidity.

Mixtures of two different propylene polymers chosen, on the one hand, from homopolymers of propylene and copolymers thereof containing less than 2 mol % of ethylene and, on the other hand, from copolymers of propylene containing from 1 to 20 mol % of ethylene and/or 1-butene may also be advantageously used.

The comonomer contents mentioned in the present description are determined by Fourier transform IR spectroscopy on the polymer converted into a 200 μm pressed film. It is the absorption bands at 732 and 720 cm$^{-1}$ that are used to determine the ethylene content and the absorption band at 767 to determine the 1-butene content.

The propylene polymer used in the composition according to the invention has generally a melt flow index (MFI), measured according to ASTM D 1238 (1986) under a load of 2.16 kg at 230° C. in the range from 0.3 to 30 g/10 min. This value is more preferably at least 1 g/10 min. Values of at most 20 g/10 min give satisfactory results. When the propylene polymer is a mixture of different propylene polymers as disclosed hereabove, the polymers may have different MFI.

The compositions according to the invention may comprise, if required, other conventional additives such as stabilizers, pigments, colourants, fillers, fire retardants, antistatic agents, antiacid agents, lubricants, slip-promoting agents, etc. Preferably these additives are added in amounts such that the above mentioned conditions are satisfied. Antiacid agents and lubricants are specially preferred. Their contents are usually of from 0.05 to 0.2 part by weight per 100 parts of the composition. Other preferred additives are the thiosynergists such as 3,3'-thio-bis propanoic acid or the dilauryl thiodipropionate. These additives are usually used in quantities of 0.001 to 0.5 part per 100 parts of the composition.

Preferably the composition according to the invention contains by way of polymers only the propylene polymer(s) defined hereabove. Compositions in which the propylene polymer(s) is (are) neither grafted nor cross-linked are usually preferred due to a better compromise of properties.

The composition according to the invention is preferably obtained by one of the following processes, which may be operated independently or in combination.

According to a first process, a propylene polymer is obtained by using polymerisation conditions chosen such that the polymer incorporates few volatile hydrocarbon compounds. An example of such conditions is the polymerisation of the propylene and of the optional comonomer(s) in a hydrocarbon diluent chosen from liquid alkanes and cycloalkanes wherein the molar fraction of propylene is at most 0.9. The diluent is usually hexane or heptane. The temperature and pressure are those generally used by the man skilled in the art. Temperatures between 50 and 90° C. and pressures between 10 and 30 atmospheres are particularly suitable. The catalytic system may be any catalytic system known to be sufficiently productive and stereospecific permitting the propylene to be polymerised in isotactic form and capable of incorporating the desired comonomer (s). The propylene polymer produced by said polymerisation reaction is then separated from the polymerisation medium by any known techniques such as filtration or centrifugation and usually dried to eliminate the polymerisation diluent. It is particularly advantageous that the polymer is dried until the content of polymerisation diluent is less than 0.1, specifically less than 0.01 weight %. Preferably the drying is carried out at a temperature of from 70 to 110° C. The duration of the drying depends on the temperature. It is usually from 0.1 to 2 h, preferably from 0.25 to 1 h. The dried propylene polymer is then usually melt blended with the additives mentioned hereabove. The melt blending is carried out by any known techniques. It may be for example first carried out at ambient temperature followed by a second mixing at a temperature above the melting point of the propylene polymer, for example in a mechanical mixer or in an extruder. The temperature of the second stage is generally from 100 to 300° C., in particular from 160 to 260° C. An alternative method comprises introducing the additives into the already molten polymer. It is preferred to proceed according to the first technique. The polymer is finally converted into expanded granules in the manner described later.

Other ways for the preparation of the composition according to the invention involve the removal of the volatile compounds. The operating conditions (temperature, duration and pressure) of such removal are such that the melting and/or the degradation of the propylene polymer are avoided.

Two embodiments give particularly good results.

According to the first embodiment, a propylene polymer is brought into contact with an aliphatic or cycloaliphatic hydrocarbon diluent containing from 4 to 7 carbon atoms at a temperature in the range of 5 to 60° C. for a period of 0.1 to 4 h in an amount of from 0.1 to 5 g of polymer per g of hydrocarbon diluent, and then separated from said diluent. The contact of the propylene polymer and the hydrocarbon diluent is generally carried out at a pressure of $10^5$ to $3\times10^5$ Pa. The temperature is preferably in the range of 10 to 60° C., temperatures of 15 to 40° C. giving the best results. The ratio of the propylene polymer to the hydrocarbon diluent is typically 0.2 to 1, with a ratio of from 0.25 to 0.75 giving the best results at reasonable costs. The duration of said treatment is advantageously from 0.2 to 2 h; with 0.3 to 1 h giving the best compromise. The propylene polymer can be separated from the hydrocarbon diluent by any known process such as filtration or centrifugation. Filtration is usually chosen for economic reasons. The propylene polymer thus obtained is then normally dried by any known process. Preferably the drying is carried out at a temperature of from 70 to 120° C. The duration of the drying depends on the temperature. It is usually from 0.1 to 2 h, preferably from 0.25 to 1.5 h. The treated propylene polymer is then advantageously mixed with the above mentioned additives. The mixing conditions (concentrations, temperature etc) are typically those described hereinabove with respect to the propylene polymer issued from the polymerisation. The polymer is then converted into expanded granules as described later.

According to the second embodiment, a propylene polymer is first melt mixed with the additive(s) described hereinabove to obtain granules. These granules are contacted with a gas stream which may be a stream of either hot air, or a gas containing steam, or pure steam, at a temperature of from 60 to 160° C. for a duration of from 30 minutes to 100 hours. Treatment of the propylene polymer with a gas stream containing steam gives good results. In this specific case, the gas stream generally comprises nitrogen or air. The temperature of this process is generally at least 70° C. and more precisely at least 80° C., values of at least 90° C. being the most common. The temperature is preferably no more than 120° C. Good results are obtained when the temperature is approximately 100° C. The duration of said treatment does not usually exceed 80 hours and more particularly 60 hours. When the treatment is carried out with a gas stream containing steam, the total amount of steam is generally at least 0.01 kg, and preferably at least 0.05 kg and more particularly at least 0.1 kg per kg of propylene polymer. The amount of steam is preferably no more than 20 kg, most often less than or equal to 10 kg and more particularly less than or equal to 5 kg of steam per kg of polymer. After treatment, the granules are converted into expanded granules. This process is particularly advantageous if performed after either one of the other two processes of the invention.

We have found that by employing any of the above processes, it is possible to obtain expanded polypropylene granules which have less than 0.035 parts per 100 of volatile compounds, and which consequently have good antifogging properties.

Generally the post-treatment of the polymer may be carried out continuously or batchwise. The device(s) used for the polymer treatments may be any receptacle into which the polymer issued from the polymerisation, the hydrocarbon diluent or the gas stream are introduced.

The melt blending of the propylene polymer and the additives is carried out in any device known for that purpose giving a sufficiently high shear rate to induce the melting of the propylene polymer. It is thus possible to work with external and internal mixers. Internal mixers are the most appropriate and amongst them extruders are the most preferred.

The additives used in the above described process are usually present in an amount of at least 0.03 to 0.5 parts by weight of the phenol (b), and up to 0.3 parts by weight of the phosphite (b) per 100 parts by weight of the propylene polymer.

The preferred quantities of these additives and the quantity of the other additives that may be used are in accordance with those described hereinabove with respect of the composition of the invention.

The expanded granules of the invention are particularly suitable for the manufacture of cellular articles, which are typically used in the automotive industry. Due to their improved resistance to fogging, the compositions of the present invention may be successfully used in the automotive industry and particularly as interior trim such as dashboards, sunvisors, headrests, or interior materials for the ceiling or the doors. It should be furthermore noted that the improvement of fogging resistance is obtained without loss and even without modifications to the mechanical and chemical properties of the propylene polymer (and especially the long term thermal stability).

The production of expanded granules and the subsequent moulding thereof into cellular articles can be carried out in a conventional manner such as described in U.S. Pat. No. 6,077,875, EP 0317995 and U.S. Pat. No. 4,626,555.

For example, polypropylene expanded granules can be produced by a process comprising dispersing particles of the polypropylene resin in a dispersion medium such as water in a closed vessel, feeding a blowing agent into the closed vessel while pressurizing, heating and stirring the dispersion, and then releasing the resin particles and the dispersion medium from the vessel under a pressure lower than the internal pressure of the vessel, generally under atmospheric pressure, thereby expanding the resin particles. At this time, it is preferred that the internal temperature of the vessel be from [the melting point of the resin—20° C.] to [the melting point of the resin +10° C.]. The expansion pressure depends on the desired expansion ratio of the expanded granules and on the base resin and foaming agent used and is usually from 5 to 60 bars.

The resin particles for the production of the expanded granules of the present invention can be obtained, for example, by extruding the molten resin from the extruder into a strand and cutting the strand. The weight of the particles is typically 0.1 to 30 mg, preferably from 0.2 to 10 mg.

The dispersion medium is not limited to water and any medium may be used which does not dissolve the resin particles. The amount of dispersion medium is generally from 100 to 1000 parts by weight, preferably from 150 to 500 parts by weight per 100 parts by weight of the resin particles.

The foaming agent used in the above-described process includes organic and inorganic foaming agents. Examples of organic foaming agents include aliphatic hydrocarbons such as propane, butane, pentane, hexane, heptane, etc.; alicyclic hydrocarbons such as cyclobutane, cyclopentane, etc.; and halogenated hydrocarbons such as chlorofluoromethane, trichlorofluoromethane, dichlorodifluoromethane, dichlorotetrafluoromethane, methyl chloride, ethyl chloride, methylene chloride, etc.; either alone or in combinations of two or more thereof. Examples of the inorganic foaming agent include nitrogen, carbon dioxide, argon, helium and air. These foaming agents may be used in any combination.

The amount of the foaming agent depends on the expansion ratio of the expanded granules and on the base resin and foaming agent used. However, the amount is generally about 5 to 50 parts by weight for the organic foaming agent or about 0.5 to 30 parts by weight for the inorganic foaming agent, per 100 parts by weight of the polypropylene particles.

A dispersing agent is generally added to the dispersion medium. Examples of the dispersing agent include fine particles of inorganic suspending agents such as aluminium oxide, titanium oxide, calcium carbonate, calcium tertiary phosphate, basic magnesium carbonate, basic zinc carbonate, kaolin, mica, clay, etc. When a dispersing agent is used, an anionic surfactant such as sodium dodecylbenzenesulphonate, sodium alkylsulphonate, sodium alkylsulphates, sodium olefin sulphates or sodium dialkylsulphosuccinates is often added as a dispersion aid in combination. Usually, the amount of the dispersing agent is from 0.1 to 2 parts by weight per 100 parts by weight of the resin particles, and the amount of dispersion aid is from 0.0001 to 0.2 part by weight per 100 parts by weight of the resin particles.

The expanded granules obtained by the process described above can be converted into granules having a higher expansion ratio by subjecting them to a pressurizing treatment with pressurized air to apply an internal pressure thereto, and then heating them with steam or heated air.

The expanded granules according to the present invention generally have a bulk density ranging from 10 to 300 kg/m$^3$.

The cellular or moulded articles made from the expanded granules of the present invention can be obtained by moulding the expanded granules using any known heating and moulding method. Generally, the expanded granules are poured into a mould and heated with steam or the like, whereby they are fusion-bonded to obtain an expansion-moulded article. If required, the expanded granules are subjected to a pressurizing treatment prior to their addition to the mould to increase the internal pressure of the beads. The pressurizing treatment is generally carried out by pressurizing the foamed beads with air in a pressure tank.

EXAMPLE 1 (COMPARATIVE)

The following ethylene-propylene random copolymer was used as a base resin:

Ethylene content: 2.3 weight %
Melting temperature: 145.2° C.
MFI: 9.8 g/10 min.

This ethylene-propylene random copolymer was blended with 2 g/kg of tetrakis[methylene(3,5-di-tert-butyl-4-hydroxyhydrocinnamate)]methane (Irganox® 1010), 0.3 g/kg of 2,6-di-tert-butyl para-cresol (BHT), 1 g/kg of bis(2,4 ditertiobutylphenyl) pentaerythritol diphosphite (Ultranox® 626), 0.6 g/kg of erucic acid amide (crodamide® ER) and 1 g/kg of calcium stearate. The mixture was melted and kneaded in an extruder and the melt was extruded into a strand. The strand was quenched in water and cut by a pelletizer, thereby forming mini-pellets (resin particles) having an average weight of 1.7 mg/pellet.

In an autoclave, 100 parts by weight of the thus-obtained resin particles, 1.4 parts by weight of kaolin as a dispersing agent and 0.18 parts by weight of sodium dodecylbenzenesulfonate as a surfactant were dispersed in 700 parts by weight of water. The dispersion was heated at a heating rate of 3° C./min to 146° C. with stirring. After, the dispersion was heated at a heating rate of 0.2° C./min to 152° C. and held at the same temperature for 16 min. In the meantime, carbon dioxide was fed into the autoclave to control the pressure within the autoclave so as to reach a pressure of 30 bars. Then, the vessel was opened at one end thereof to release the resin particles and water under atmospheric pressure, while introducing high-pressure air into the autoclave, thereby expanding the resin particles to obtain expanded granules. The expanded granules were then allowed to stand for 24 hours at room temperature and atmospheric pressure to conform the internal pressure of the expanded granules to atmospheric pressure. After this ageing process, the apparent density of the expanded granules was 35 g/l.

The expanded granules were then placed in a pressure vessel and compressed with air at a pressure of 2.5 bars, and the compressed expanded beads placed in a mould having internal dimensions of 300 mm×400 mm×80 mm, preheated with steam with a steam pressure of 2.2 bars and then heated with steam with a steam pressure of 3.2 bars to expand and mould the expanded granules into a moulded article. The moulded article was aged for 24 hours at 60° C. and atmospheric pressure. The thus-obtained article had a density of 63 g/l and a volatile compounds content of 1140 mg/kg (0.114 parts per 100 by weight).

EXAMPLE 2 (COMPARATIVE)

Example 1 was repeated except that in this case the ethylene-propylene random copolymer was blended with 2 g/kg of the Irganox® 1010 product, 0.5 g/kg of tris(2,4-di-tert-butylphenyl)phosphite (Irgafos® 168), 2 g/kg of distearylthiodipropionate and 0.5 g/kg of hydrotalcite.

The expanded granules produced with this composition had an apparent density of 34 g/l and the final moulded article produced with the expanded granules had a density of 61 g/l and a volatile compounds content of 796 mg/kg (0.080 parts per 100 by weight).

EXAMPLE 3

Example 2 was repeated, except that the mini-pellets (resin particles) were contacted with a stream of steam at 100° C. for 15 hours (0.5 kg of steam per kg of composition) prior to formation into expanded granules.

The expanded granules produced from this composition had an apparent density of 35 g/l and the final moulded article produced with the expanded granules had a density of 59 g/l and a volatile compounds content of 326 mg/kg (0.033 parts per 100 by weight).

EXAMPLE 4

Example 2 was repeated, except that the ethylene-propylene random copolymer powder was initially contacted with hexane at 30° C. for 1 hour (0.5 kg of resin per kg of hexane).

The expanded granules ultimately produced from this composition had an apparent density of 35 g/l and the final moulded article produced with the foamed beads had a density of 61 g/l and a volatile compounds content of 99 mg/kg (0.010 parts per 100 by weight).

What is claimed is:

1. A composition comprising expanded granules, which is of semi-crystalline propylene polymer containing, per 100 parts by weight, less than 0.035 parts by weight of volatile compounds.

2. The composition according to claim 1, containing, per 100 parts by weight, less than 0.020 parts by weight of volatile compounds.

3. A composition according to claim 1, containing, per 100 parts by weight, less than 0.05 parts by weight of a sterically hindered phenol having a molecular weight lower than 500 daltons, and less than 0.05 parts by weight of organic phosphite of formula $P(OR)_3$ wherein each R independently represents, an alkyl radical or non sterically hindered aryl radical.

4. A composition according to claim 3 containing, per 100 parts by weight, from 0.03 to 0.5 parts by weight of a sterically hindered phenol having a molecular weight of at least 500 daltons, and up to 0.3 parts by weight of an organic phosphite of the formula $P(OR')_3$ wherein each R' independently represents an alkyl or aryl radical at least one of which is sterically hindered.

5. A composition according to claim 4, wherein the weight ratio of the phenol having a molecular weight of at least 500 daltons to the organic phosphite $P(OR')_3$ is from 1.5 to 10.

6. A composition according to claim 1, wherein the propylene polymer is a homopolymer, or a copolymer containing up to 50 weight % of at least one comonomer chosen from ethylene and α-olefins containing from 4 to 8 carbon atoms or mixtures thereof.

7. A comoosition according to claim 6, wherein the propylene polymer is a copolymer containing from 1 to 6 mol % of ethylene.

8. A process for obtaining expanded granules as defined in claim 1, comprising the steps of polymerizing propylene and any comonomer(s) in a hydrocarbon diluent chosen from liquid alkanes and cydoalkanes, wherein the molar fraction of propylene is at most 0.9, and then converting the resultant polypropylene into expanded granules.

9. A process for obtaining expanded granules as defined in claim 1, comprising the steps of contacting a propylene polymer with an aliphatic or cycloaliphatic hydrocarbon diluent containing from 4 to 7 carbon atoms at a temperature in the range of 5 to 60° C. for a period of from 0.1 to 4 hours in an amount of from 0.1 to 5 g of propylene polymer per 1 g of hydrocarbon diluent, and separating the polymer from said diluent, and then converting the resultant polypropylene into expanded granules.

10. A process according to claim 8, wherein after separation of the polymer from the polymerization medium and/or hydrocarbon diluent and drying, the polymer is melt mixed with, per 100 parts by weight of the final composition, from 0.03 to 0.5 parts by weight of sterically hindered phenol having a molecular weight of at least 500 daltons, and up to 0.3 parts by weight of an organic phosphite of the formula $P(OR')_3$ wherein each R' independently represents an alkyl or aryl radical at least one of which is sterically hindered.

11. A process for obtaining expanded granules as defined in claim 1, comprising the steps of contacting a propylene polymer with a gas stream at a temperature in the range of 60 to 160° C. for a duration from 30 minutes to 100 hours, after which the polypropylene is converted into expanded granules.

12. A process according to claim 11, wherein prior to contacting the propylene polymer with the gas stream, the polymer is melt mixed with, per 100 parts by weight of the final composition, from 0.03 to 0.5 parts by weight of sterically hindered phenol having a molecular weight of at least 500 daltons, and up to 0.3 parts by weight of an organic phosphite of the formula $P(OR')_3$ wherein each R' independently represents an alkyl or aryl radical at least one of which is sterically hindered.

13. The process according to claim 11, wherein prior to contacting the propylene polymer with the gas stream, it is subjected to the process of claim 9.

14. A moulded article made from the expanded granules of claim 1.

15. A moulded article made from the expanded granules of claim 6.

16. A process according to claim 9, wherein after separation of the polymer from the polymerization medium and/or hydrocarbon diluent and drying, the polymer is melt mixed with, per 100 parts by weight of the final composition, from 0.05 to 0.5 parts by weight of sterically hindered phenol having a molecular weight of at least 500 daltons, and up to 0.3 parts by weight of an organic phosphite of the formula $P(OR')_3$ wherein each R' independently represents an alkyl or aryl radical at least one of which is sterically hindered.

17. The process according to claim 12, wherein prior to contacting the propylene polymer with the gas stream, it is subjected to the process of claim 10.

* * * * *